Dec. 28, 1926.                                              1,612,150
                        T. R. PLANK
                   BEARING FOR LEAF SPRINGS
                      Filed July 30, 1925

Inventor
*Theodore R. Plank*

By  *A. B. Bowman*
            Attorney

Patented Dec. 28, 1926.

1,612,150

UNITED STATES PATENT OFFICE.

THEODORE R. PLANK, OF LOS ANGELES, CALIFORNIA.

BEARING FOR LEAF SPRINGS.

Application filed July 30, 1925. Serial No. 47,021.

My invention relates to bearings for leaf springs and the objects of my invention are: first, to provide a bearing to be inserted between the ends of the leaves of leaf springs for overcoming the friction between the leaves, thus providing a very resilient leaf spring; second, to provide a bearing of this class in which steel balls are retained by a resilient, pliable and adherent member, thus providing a combination of ball bearing with a resilient, pliable and adherent retainer therefor; third, to provide a bearing of this class in which the retainer is provided with a central hole forming an air pocket causing it to maintain its position on the spring leaves as well as providing an air cushion in combination with the ball bearing supports for the spring leaves; fourth, to provide a bearing of this class which may be quickly and readily positioned between the separate leaves of the spring and which will maintain its position without securing means; fifth, to provide a novelly constructed bearing for leaf springs, and sixth, to provide a bearing of this class which is very simple and economical of construction, efficient in its action, durable, easy to place in position, and which will not readily deteriorate or get out of order.

Figure 1:
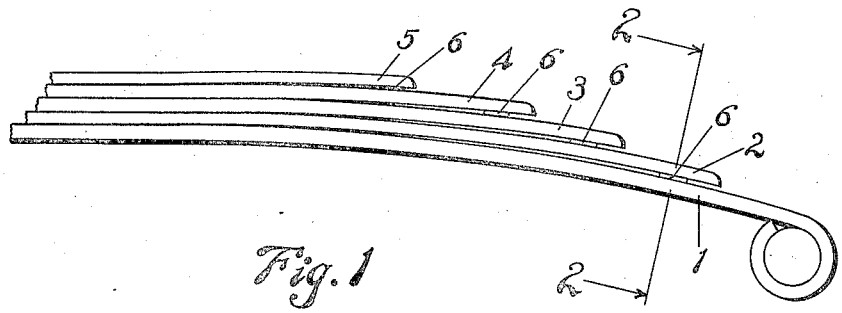
Figure 2:
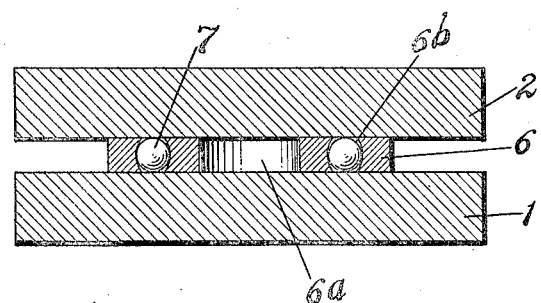
Figure 3:
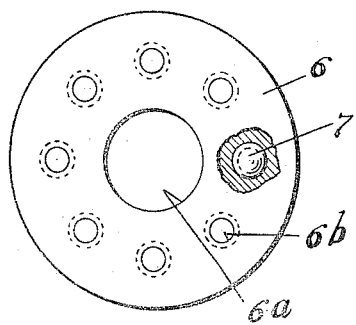

With these and other objects in view as will appear hereinafter, my invention consists of certain novel features of construction, combination, and arrangement of parts and portions as will be hereinafter described in detail and particularly set forth in the appended claims, reference being had to the accompanying drawings and to the characters of reference thereon which form a part of this application, in which:

Figure 1 is a side elevational view of a fragmentary portion of a vehicle leaf spring and showing my leaf bearings positioned therein ready for use; Fig. 2 is a sectional view on an enlarged scale through 2—2 of Fig. 1, and Fig. 3 is a top or plan view of the bearing alone showing a portion broken away and in section to facilitate the illustration.

Similar characters of reference refer to similar parts and portions throughout the several views of the drawings.

The spring leaves 1, 2, 3, 4, and 5, ball retainers 6, and ball members 7 constitute the principal parts and portions of my spring structure with the bearings in position.

The spring leaf members 1, 2, 3, 4 and 5 are of the conventional type, and interposed between the adjacent leaf members near the ends by spreading the members apart and inserted therein are the bearings which consist of the annular, resilient retaining member 6, which is preferably composed of rubber of approximately 1″ to 1¼″ in diameter and provided with a central hole 6$^a$ which is preferably approximately ¼″ in diameter. This member 6 is preferably a little thicker than the diameter of the balls used as bearings, it being preferred to use a ball about ⅛″ in diameter, and the member 6 being approximately 1/64″ thicker than the diameter of the ball.

This member 6 is provided with a plurality of holes 6$^b$ therethrough slightly smaller in diameter than the diameter of the balls so that the balls are forced therein slightly spreading the material around the holes as shown in Figs. 2 and 3 of the drawings, it being preferred to place these holes 6$^b$ in a row as shown. However, it is obvious that they may be in staggered relation or otherwise, as desired. Also it is obvious that the retainer member 6 may be polygon shaped as well as annular if desired.

It will be noted that the retainer member 6 being formed of rubber is inherently resilient, pliable, and adherent, and the hole 6$^a$ in the center makes it more pliable and also forms an air cushion with the leaves of the spring tending to hold it in position between the leaves of the spring and providing great pliability and resiliency and supporting the balls 7 which form the support for the spring leaves and revolve in the member 6 with the relative movement of the adjacent spring leaves, thus providing a resilient, pliable retainer for the ball bearings.

Although I have shown and described a particular construction, combination and arrangement of parts and portions, I do not wish to be limited to this particular construction, combination and arrangement, but desire to include in the scope of my invention the construction, combination, and arrangement substantially as set forth in the appended claims.

Having thus described my invention what I claim as new and desire to secure by Letters Patent is:

1. In a bearing for spring leaves, a flat resilient ball retainer provided with a plurality of holes therein and balls positioned in each of said holes, 2. In a bearing for spring leaves, a flat adherent ball retainer provided with a plurality of holes therein and balls positioned in each of said holes.

3. In a bearing for spring leaves, a flat pliable ball retainer provided with a plurality of holes therein and balls positioned in each of said holes.

4. In a bearing for spring leaves, a flat resilient, adherent, and pliable ball retainer provided with a plurality of holes therein and balls positioned in some of said holes.

5. In a ball retainer for leaf springs, a flat resilient, adherent member provided with a central hole and a plurality of relatively small holes therethrough surrounding said central hole and a steel ball mounted in some of said relatively small holes.

6. In a device of the class described, a spring composed of a plurality of leaves interposed, one upon the other, in laminated form, a bearing interposed between the ends of adjacent leaves consisting of a flat rubber member provided with a central hole and with a row of relatively small holes therethrough surrounding said central hole and balls slightly smaller than the diameter of said holes forced in said holes, and the whole forming a bearing for reducing the friction between the leaves of the spring.

7. In a device of the class described, the combination with the conventional leaf spring, of a plurality of bearings interposed between the separate leaves of the spring near the ends, each bearing consisting of a flat resilient, adherent, pliable member provided with a central hole and with a plurality of relatively small holes and a plurality of balls, one positioned in each of said relatively small holes.

8. In a bearing for spring leaves, a flat resilient retainer member provided with a hole therein, and a roller member, positioned in said hole.

9. In a bearing for spring leaves, a flat resilient member interposed between two adjacent leaves of a spring and provided with a hole therein, and a roller member positioned in said hole and retained by said resilient member.

10. In a bearng for spring leaves, a flat adherent resilient retainer member provided with a hole therein, and a roller member positioned in said hole.

In testimony whereof, I have hereunto set my hand at Los Angeles California this 22nd day of July, 1925.

THEODORE R. PLANK.